US008521648B2

(12) United States Patent
Bixler et al.

(10) Patent No.: US 8,521,648 B2
(45) Date of Patent: Aug. 27, 2013

(54) CONSOLIDATED PAYMENT OPTIONS

(75) Inventors: Matt Bixler, Denver, CO (US); Robert Newton, San Francisco, CA (US); Dean Seifert, Parker, CO (US); Dave Owen, Castle Rock, CO (US); Elizabeth Petri, Littleton, CO (US)

(73) Assignee: The Western University Company, Englewood, CO (US)

( * ) Notice: Subject to any disclaimer, the term of this patent is extended or adjusted under 35 U.S.C. 154(b) by 613 days.

(21) Appl. No.: 12/134,066

(22) Filed: Jun. 5, 2008

(65) Prior Publication Data

US 2009/0006205 A1 Jan. 1, 2009

Related U.S. Application Data

(60) Provisional application No. 60/946,341, filed on Jun. 26, 2007.

(51) Int. Cl.
*G06Q 40/00* (2012.01)
(52) U.S. Cl.
USPC .................. 705/40; 705/39; 705/35; 705/44
(58) Field of Classification Search
USPC ............................................................ 705/40
See application file for complete search history.

(56) References Cited

U.S. PATENT DOCUMENTS

| | | | | |
|---|---|---|---|---|
| 5,220,501 A * | 6/1993 | Lawlor et al. | | 705/40 |
| 6,188,993 B1 * | 2/2001 | Eng et al. | | 705/37 |
| 6,493,685 B1 | 12/2002 | Ensel et al. | | |
| 6,994,251 B2 | 2/2006 | Hansen et al. | | |
| 7,069,234 B1 * | 6/2006 | Cornelius et al. | | 705/80 |
| 7,117,178 B2 | 10/2006 | Thompson | | |
| 7,155,409 B1 | 12/2006 | Stroh | | |
| 7,280,984 B2 | 10/2007 | Phelan, III et al. | | |
| 2001/0051919 A1 * | 12/2001 | Mason | | 705/40 |
| 2002/0016763 A1 * | 2/2002 | March | | 705/39 |
| 2002/0107796 A1 | 8/2002 | Nakai | | |
| 2002/0116334 A1 | 8/2002 | Bennett et al. | | |
| 2003/0097331 A1 | 5/2003 | Cohen | | |
| 2004/0088261 A1 * | 5/2004 | Moore et al. | | 705/64 |
| 2005/0096990 A1 * | 5/2005 | Algiene et al. | | 705/21 |
| 2005/0177477 A1 | 8/2005 | Arghavanifard et al. | | |
| 2005/0262130 A1 | 11/2005 | Mohan | | |
| 2005/0283434 A1 | 12/2005 | Hahn-Carlson et al. | | |
| 2007/0016489 A1 | 1/2007 | Hansen et al. | | |
| 2007/0100711 A1 | 5/2007 | Stroh | | |
| 2007/0118472 A1 * | 5/2007 | Allen-Rouman et al. | | 705/39 |

OTHER PUBLICATIONS

Patent Cooperation Treaty, PCT/US08/67246, Jun. 17, 2008.*

* cited by examiner

*Primary Examiner* — Hai Tran
(74) *Attorney, Agent, or Firm* — Kilpatrick Townsend & Stockton LLP

(57) ABSTRACT

A system for making financial transfers between subscribers of a financial transfer service is disclosed. The system may include a receiving subscriber interface (RSI), a sending subscriber interface (SSI), and an agent server (AS). The RSI may be configured to accept a set of invoice information including an identifier of a destination account. The SSI may be configured to accept a set of payment information including an identifier of a source account. The AS may be configured to receive the set of invoice information and create an invoice based on the set of invoice information. The AS may also be configured to transmit the invoice and receive the set of payment information. The AS may also be configured to cause an amount of funds to be transferred from the source account on a source transfer network to the destination account on a destination transfer network via a primary transfer network.

23 Claims, 3 Drawing Sheets

CONSOLIDATED PAYMENT OPTIONS

CROSS-REFERENCE TO RELATED APPLICATIONS

This application claims priority to Provisional U.S. Patent Application No. 60/946,341 filed Jun. 26, 2007, entitled "CONSOLIDATED PAYMENT OPTIONS," the entire disclosure of which is hereby incorporated by reference, for all purposes, as if fully set forth herein.

BACKGROUND OF THE INVENTION

This invention relates generally to financial transfers. More specifically, the invention relates to financial transfers between subscribers of a financial transfer service.

Currently, businesses and individuals use two primary services for transferring funds to other businesses and individuals across international borders: bank wires and money transfers. Each of these services carries with it certain disadvantages inherent to each transaction, and problems to which bank wires and money transfers are susceptible may also arise in any given transaction.

Among the various problems associated with bank wires and money transfers are the high transaction costs because of the special nature of such services. These services also may require multiple days for funds to reach their destination, slowing down the commerce between parties. Furthermore, in some instances people may have to travel to a bank or money transfer agent to initiate and/or complete a transaction.

When problems with an individual transfer arise, possibly due to incorrect information being used to initiate transactions, more travel to and from the bank or money transfer agent may be necessary to resolve the problems. Bank wires and money transfers also often involve physical paper receipts, requiring a person to manually enter the receipt information into other accounting systems, or at least verify the receipt information is consistent with information on separate accounting systems.

Other problems that may exist using traditional transfer methods include lack of transfer fee transparency; lack of the transparency in timing of transfers; the need to fill out physical forms; need to submit information for the same payers and/or payees repeatedly; and risks associated with having payers know payee bank information. Embodiments of the invention provide solutions to these and other problems.

BRIEF DESCRIPTION OF THE INVENTION

In one embodiment, a system for making financial transfers between subscribers of a financial transfer service is provided. The system may include a receiving subscriber interface, a sending subscriber interface, and an agent server. The receiving subscriber interface may be configured to accept a set of invoice information from a first subscriber, where the set of invoice information may include an identifier of a destination account. The sending subscriber interface may be configured to accept a set of payment information from a second subscriber, where the set of payment information may include an identifier of a source account. The agent server may be configured to receive the set of invoice information from the receiving subscriber interface and create an invoice based at least in part on the set of invoice information. The agent server may also be configured to transmit the invoice to the sending subscriber interface and receive the set of payment information from the sending subscriber interface. The agent server may further be configured to cause an amount of funds to be transferred from the source account on a source transfer network to the destination account on a destination transfer network via a primary transfer network.

In another embodiment, a method for making financial transfers between subscribers of a financial transfer service is provided. The method may include receiving a set of invoice information from a first subscriber, where the set of invoice information may include an identifier of a destination account. The method may also include creating an invoice based at least in part on the set of invoice information. The method may further include transmitting the invoice to the second subscriber. The method may additionally include receiving a set of payment information from a second subscriber, where the set of payment information includes an identifier of a source account. The method may moreover include transferring an amount of funds from the source account on a source transfer network to the destination account on a destination transfer network via a primary transfer network.

In another embodiment, a system for making financial transfers between subscribers of a financial transfer service is provided. The method may include a first means, a second means, and a third means. The first means may be for accepting a set of invoice information from a first subscriber, where the set of invoice information includes an identifier of a destination account. The first means may include, merely by way of example, a receiving subscriber interface or any other component disclosed herein or otherwise known in the art, now and in the future, for such purposes. The second means may be for accepting a set of payment information from a second subscriber, where the set of payment information includes an identifier of a source account. The second means may include, merely by way of example, a sending subscriber interface or any other component disclosed herein or otherwise known in the art, now and in the future, for such purposes. The third means may be for causing an amount of funds to be transferred from the source account on a source transfer network to the destination account on a destination transfer network via a primary transfer network. The third means may include, merely by way of example, an agent server or any other component disclosed herein or otherwise known in the art, now and in the future, for such purposes.

BRIEF DESCRIPTION OF THE DRAWINGS

The present invention is described in conjunction with the appended figures.

DETAILED DESCRIPTION OF THE INVENTION

Figure 1:
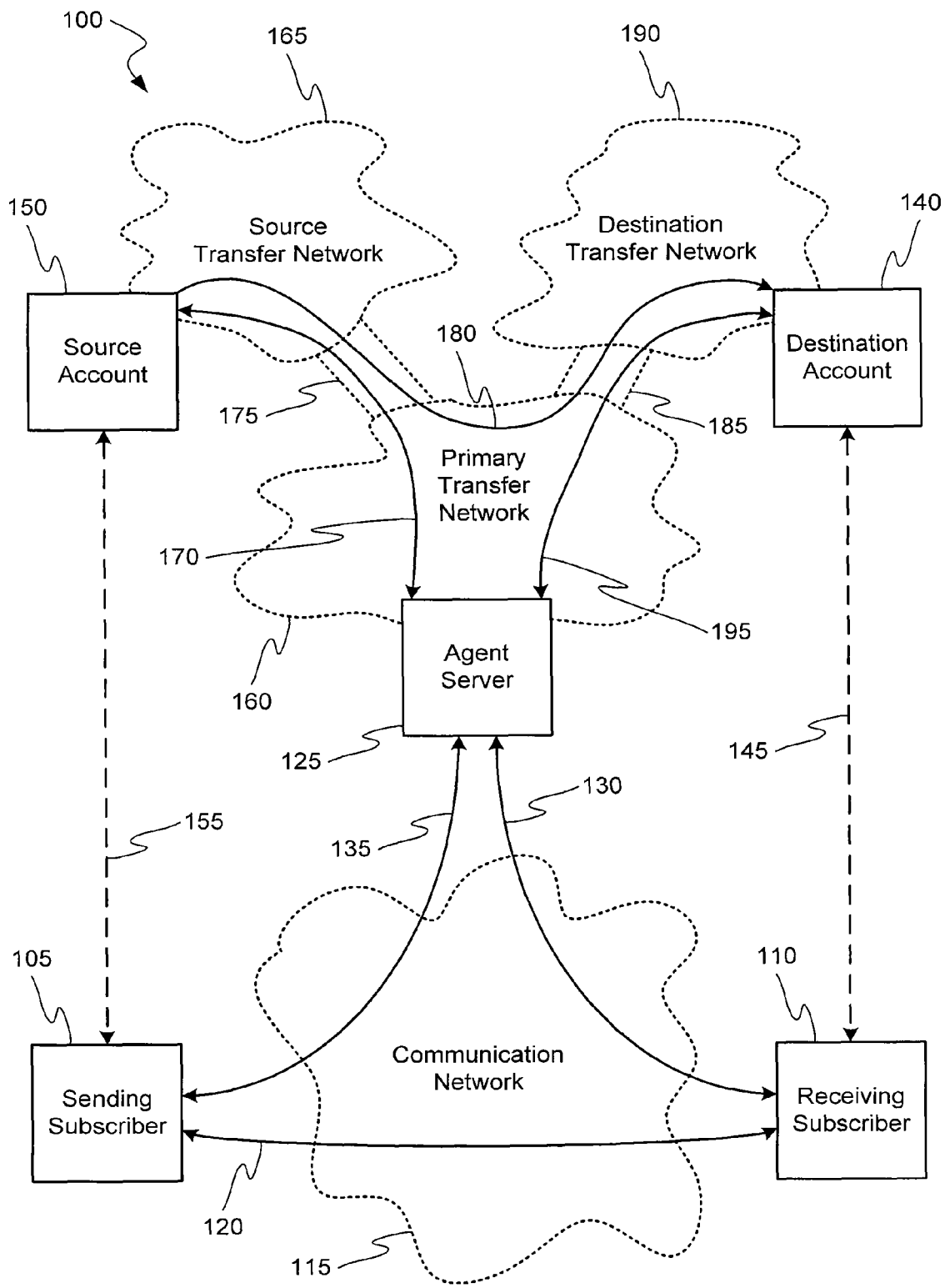
FIG. 1 is a block diagram view of one system of the invention for making financial transfers between subscribers of a financial transfer service.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment of the invention, a system for making financial transfers between subscribers of a financial transfer service is provided. Merely by way of example, subscribers may include any person or entity which uses the financial transfer service, any person or entity which pays to use the financial transfer service, and/or any person or entity which is associated with a service or organization to which the financial transfer service is made available. In some embodiments, there may be different levels of subscribers, with different levels of subscribers being able to access/use and/or not access/use different sub-services of the financial transfer service. In some embodiments, non-subscribers may be able to access/use and/or not access/use different sub-services of the financial transfer service. Subscribers and enrollment procedures are described in U.S. Patent Publication No. 2007/0016489, filed Jul. 17, 2006 and entitled "Systems and Methods for Enrolling Consumers in Goods and Services," the entire disclosure of which is hereby incorporated by reference for all purposes.

In some embodiments, the system may include a receiving subscriber interface, a sending subscriber interface, and/or an agent server. In some embodiments, the system may also include a communication network, a source transfer network, a destination transfer network, and/or a primary transfer network.

Subscribers may be contractually engaged by the entity which controls and/or operates the agent server. In some embodiments, risk and compliance scores may be determined for each subscriber (and non-subscribers which use the financial transfer service). Risk scores may reflect credit worthiness and fraud risk involved with handling/executing fund transfers for a particular subscriber. Compliance scores may reflect a particular subscriber's compliance with the financial transfer service's procedures, and the subscriber's adherence to contractual obligations with other subscribers with which fund transfers are exchanged. Risk and compliance scores may govern the amount and/or the rate at which the agent server will allow fund transfers to be made through the system as well as the foreign exchange rate and fee rates granted to a particular subscriber.

The receiving subscriber interface may be configured to accept a set of invoice information from a first subscriber which will be directed to a second subscriber. In some embodiments, the receiving subscriber interface may be a web page, possibly transmitted via a communication network from the agent server to a computer system associated with the first subscriber. In some embodiments, merely by way of example, the receiving subscriber interfaces may be displayed and/or embodied on a personal computer, a kiosk computer, a mobile phone, a personal data assistance, a smart phone, an interactive voice response telephony system, and automotive voice response unit telephony system, etc. The communication network may, merely by way of example, be the Internet, an extranet, an intranet, and/or a telephone network. In other embodiments, the receiving subscriber interface may be a software program running on a computer system associated with the first subscriber, and with the computer system possibly in communication with the agent server over a communication network.

The set of invoice information may include an identifier of a destination account to which payment for any given invoice may be directed. Merely by way of example, the set of invoice information may also include a requested amount of funds, a due date, a description of the goods/services/etc. for which the invoice is directed, a name of the first subscriber, the name of an entity associated with the first subscriber, an early payment date, an incentive for paying by the early payment date, tax costs, including Value Added Tax, etc.

The agent server may be configured to receive the set of invoice information from the receiving subscriber interface and create an invoice based at least in part on the set of invoice information. In other embodiments, the receiving subscriber interface may be configured to create the invoice, and the agent server may receive the invoice. The invoice may be in any digital format, and merely by way of example, the digital format may be any file imported from an accounting system such as an accounts receivable system (for example, Quickbook™, Great Plains™), a Microsoft™ Word™ or Excel™ file, .rss file, .xml file, or a .pdf file. In some embodiments, the agent server may be able to read the file, possibly employing image/character recognition if necessary. By reading the file, information about how the receiving subscriber wishes to receive funds may be determined. The agent server may also be configured to transmit the invoice to the sending subscriber interface.

In some embodiments, the agent server may "push" the invoice to the sending subscriber interface. In other embodiments, the sending subscriber interface may "pull" the invoice from the agent server. In yet other embodiments, a combination of "push" and "pull" methods may be employed. Merely by way of example, if the sending subscriber interface is active, the agent server may be configured to detect such a condition and "push" the invoice to the sending subscriber interface. However, if the sending subscriber interface is not active, the invoice may be stored on a machine readable medium associated with the agent server, and await the sending subscriber interface becoming active. Proximate to the sending subscriber interface becoming active, the sending subscriber interface may then "pull" the invoice from the agent server. In some embodiments, the agent server may be configured to cause the sending subscriber interface to become active when an invoice is received and/or created.

In some embodiments, the invoice may not be delivered to the sending subscriber interface unless a certain event occurs. In some embodiments, the event may be a date entered into the receiving subscriber interface. In other embodiments, the event may be a set time period after entry of the associated invoice information into the sending subscriber interface. In yet other embodiments, the event may be availability, packaging, shipment, and/or performance of the goods and/or services by the first subscriber. In some embodiments, the event may be triggered by a third party, rather than any subscriber. Merely by way of example, a certain progression of a shipment through a shipper's shipping system. For example, initial receipt of the shipment at a shipment facility.

The sending subscriber interface may be configured to receive the invoice from the agent server, and/or receive invoice information passed on from the agent server and create an invoice. The sending subscriber interface may also be configured to display the invoice for review by the second subscriber to which the invoice is directed. In some embodiments, the subscriber interface, or a system in communication therewith, may be able to import the invoice or information from the invoice into an accounting system, for example an accounts payable system (for example, Quickbook™, Great Plains™).

The sending subscriber interface may further be configured to accept a set of payment information from the second subscriber. In some embodiments, merely by way of example, the sending subscriber interfaces may be displayed and/or embodied on a personal computer, a kiosk computer, a mobile phone, a personal data assistance, a smart phone, a mobile phone, an interactive voice response telephony system, and automotive voice response unit telephony system, etc. In some embodiments, the sending subscriber interface may have at least some portions which are pre-populated with invoice information (for example, identifiers of destination accounts). The set of payment information may include an identifier of a source account or accounts from which funds may be transferred to satisfy the invoice.

The set of payment information may also include a date, an amount, and/or a secondary source account. The secondary source account may be used to fund a transfer if the primary source account does not have sufficient funds to satisfy the invoice. The set of payment information may also have instructions to draw from multiple sources to satisfy an invoice. In some embodiments, multiple receivers, or multiple invoices from one or a multiple of receivers, may be sent funds from one or a multiple of sources. In these or other embodiments, partial payments may also be supported, perhaps in proportion to various stages of an associated transaction being completed. Merely by way of example, 25% may be a down payment, 50% may be paid on performance/deliver of services/goods, and 25% may be paid upon certification of the services/goods. In some embodiments, the set of payment information may include early payment incentive instructions. In all of these or other embodiments, recurring payments may also be supported, for example, utility payments, payroll wages, etc.

In some embodiments, the early payment incentive instructions may include a "blanket" rule to satisfy, or not satisfy, all early payment incentive conditions. In other embodiments, the early payment incentive instructions may include conditional rules, whereby early payment incentive conditions will be satisfied if the conditional rules are satisfied. Merely by way of example, conditional rules may include whether the source account has enough funds at a date specified by the early payment incentive condition, or whether the early payment incentive will be greater than the financial return on retaining the required funds for the invoice.

The set of payment information may also include one or more conditions, which until met, may cause the agent server to wait to initiate a funds transfer, or for the payment information to be transmitted to the agent server. Merely by way of example, a condition may include sufficient availability of funds in the source account to satisfy the invoice, confirmation of availability, packaging, shipment, and/or performance of the goods and/or services by the first subscriber.

In some embodiments, both the first subscriber and the second subscriber may, possibly via either the sending subscriber interface and/or the receiving subscriber interface, input and save at the agent server profiles for at least partially similar and/or repeated transactions. This may allow a sender and/or a receiver to easily access invoice information and/or payment information for at least partially similar transactions (possibly due to repeated transfers between the same parties).

In some embodiments, both the sending subscriber interface and the receiving subscriber interface may have different levels of functionality depending on the user accessing the interface. Merely by way of example, some users may have viewing privileges, while other users may have viewing and action initiation privileges.

The agent server may further be configured to cause an amount of funds to be transferred from the source account on a source transfer network to the destination account on a transfer network via a primary transfer network. In some embodiments, the source transfer network and the primary transfer network may be the same network. In other embodiments, the destination transfer network and the primary transfer network may be the same network. In yet other embodiments, the source transfer network, the primary transfer network, and the destination transfer network may all be the same network.

Merely by way of example, each of the source transfer network, the primary transfer network, and/or the destination transfer network may be an Automated Clearing House ("ACH") network (which may use a routing number and account number to identify accounts), a debit network, a bank wire transfer network, a credit card network, an Automated Teller Machine ("ATM") network, a stored value network, a prefunded value network, a staged cash payment network, or a money transfer network such as the Western Union® Money Transfer Network. In an exemplary embodiment, the source transfer network and the source account may be an ACH network and an associated checking or savings account; the primary transfer network may be a money transfer network; and the destination transfer network and destination account may be an ACH network and an associated checking or savings account. The source account may, merely by way of example, be any account associated with any of the above networks, and by more specific example, a savings account, a checking account, a credit card account, a stored value account, a prefunded account, and/or an account which includes cash payments staged for such transactions. In some embodiments, cash payments for staged transactions may be made by subscribers or others at agents of financial service providers, or at agents associated with the financial transfer service.

In some embodiments, a source interim account may be used by the first subscriber to route funds from the source account to a source interim account from which they will be transferred by the agent server. Likewise, in some embodiments, a destination interim account may be used by the second subscriber to route funds from the destination interim account to the destination account after receipt. Interim accounts are discussed in greater detail in U.S. patent application Ser. No. 10/295,769, filed Nov. 14, 2002, and entitled "Systems and Methods for Providing Individual Financial Access," the entire disclosure of which is hereby incorporated by reference for all purposes. In embodiments where interim accounts are employed, subscribers may accrue benefits from use of the interim account, for example, incentives for use of credit card accounts.

In some embodiments, the agent server may transfer the funds from the source account to an agent account before transferring the funds to the destination account. In an exemplary embodiment, where funds are provided by the second subscriber prior to a due date specified by the first subscriber, and no negative consequences for the second subscriber will occur, such as delaying of shipment, the agent account may be employed to hold the funds until a point in time closer in proximity to the due date. In these embodiments, the agent account may accrue interest or other financial reward for the operator of the agent server while the funds are held in the agent account. These or other escrow features may be employed in some embodiments. Additional escrowing features are described in U.S. Pat. No. 7,117,178, issued Oct. 3, 2006 and entitled "Systems and Methods to Facilitate Payment for Shipped Goods," the entire disclosure of which is hereby incorporated by reference for all purposes.

In some embodiments, the agent server may provide post-transfer features for both the first subscriber and the second subscriber. Merely by way of example, the agent server may provide status of requested fund transfers and/or a history of past completed fund transfers. The status of a requested fund transfer may indicate in which transfer network the transfer is currently proceeding through, which transfer networks the fund transfer has already moved through, and which transfer networks the fund transfer has remaining to move through. Other post-transfer and during-transfer features are described in U.S. Provisional Patent Application No. 60/946,344, filed Jun. 26, 2007, and entitled "Methods and Systems for Tracking and Reporting Financial Transactions," the entire disclosure of which is hereby incorporated by reference for all purposes.

In some embodiments, a graphical display, possibly similar to a map may display for a subscriber at an interface to show the progress and/or completed or future path of fund transfers, invoice progress, and/or shipment progress. In these or other embodiments, any interface discussed herein may be a graphical interface. In some embodiments, automatic e-mails, short message service messages, multimedia messaging service messages, instant messages, automatic voice mail messages, voice dial out, physical mail and facsimile documents may also be transmitted to subscribers at various stages and/or completion of fund transfers.

Turning now to FIG. 1, a system 100 for making financial transfers between subscribers of a financial transfer service is shown. Employing system 100, a sender 105 and a receiver 110 may conduct a fund transfer. Demonstrating operation of system 100 through an example transaction, sender 105 may purchase goods and/or services from receiver 110, possibly via communication network 115. Merely by way of example, the transaction may occur via a communication 120 across the Internet, where the Internet is the communication network 115. In some embodiments, an agent server 125 may also assist in completing the arrangement of the transaction for goods and/or services.

Receiver 110 may then, possibly through a sending subscriber interface, send invoice information or an invoice to agent server 125 via a communication path 130. Agent server 125 may, if necessary, assemble the invoice, and then transmit the invoice to sender 105, possibly specifically to a sending subscriber interface, via communication path 135. Agent server 125 may derive certain information from the invoice, or invoice information, to assist in tracking and/or expecting payment instructions from sender 105.

Sender 105 may now have instructions via the invoice for where payment for the transaction with receiver 110 should be sent. In this example, receiver 110 may be requesting payment be sent to destination account 140. Receiver 140 may have access to destination account 140 as shown by access line 145. In some embodiments, access to destination account 140 may also be via communication network 115.

Similarly, sender 105 may have access to source account 150 as shown by access line 155. In some embodiments, access to source account 150 may also be via communication network 115. Sender 105 may wish to satisfy the invoice from receiver 110 with funds from source account 150.

Sender 105 may then enter payment information, including a source account identifier and access authorization information into a sending subscriber interface. The payment information may be transmitted to agent server 125 via communication path 135.

Agent server 125 may be part of and/or in communication with primary transfer network 160. Agent server 125 may access source account 150 via primary transfer network 160 and source transfer network 165, where source account 150 resides (or where source account 150 may be accessed). Primary transfer network 160 may be in communication 170 with source transfer network 165 via a communication link 175, which may possibly be a proprietary link owned and/or established by agent server 125. The agent entity may negotiate and/or implement communication link 175 in multiple different countries between there-existing financial networks and primary transfer network 160 which may, merely by way of example, be owned and/or operated by the agent or a third party, including without limitation a government entity. Consequently, agent server 125 may also be configured to conduct currency exchange calculations. In some embodiments, agent server 125 may allow sender 105 or any other party to "lock in" a foreign exchange rate, possibly by directing funds to be transferred to the agent for immediate conversion, and crediting of an account held for the party to satisfy future fund transfers. In some embodiments, any currency exchange may be completed by or with assistance from a third party Agent server 125 may initiate a transfer of funds 180 from source account 150 to destination account 140. Transfer of funds 180 may occur via a source transfer network 165, communication link 175, primary transfer network 160, another communication link 185, and destination transfer network 190 where destination account 140 resides (or where destination account 140 may be accessed). In some embodiments the transfer may occur in that order, while in other embodiments it may occur in any one of a multitude of other possible orders.

Agent server 125 may also be in communication 195 with destination account 140 via primary transfer network 160, communication link 185, and destination transfer network 190. In some embodiments, agent server 125 may employ communication 195 to verify receipt of funds at destination account 140. Agent server 125 may use access and/or authentication information supplied by receiver 110 to conduct verifications.

After and/or during the funds transfer, sender 105 and receiver 110 may access agent server 125 via communication paths 135, 130 respectively, to determine the status and/or view historical records related to the transaction. In some embodiments, agent sever 125 may be configured to allow sender 105 and/or receiver 110 to cause agent server 125 to modify and/or cancel the fund transfer.

Note that the embodiment in FIG. 1 and the example transaction discussed above is merely exemplary, and those skilled in the art will now recognize multiple fashions in which system 100 may be employed to conduct fund transfers, including methods which involve more or fewer components than shown in FIG. 1, possibly as discussed above and herein, or otherwise. Merely by way of example, in some embodiments, sender 105 may visit a physical agent operated or associated location to submit a cash, check, money order, prepaid or stored value account, debit card, ATM card and/or credit card payment to the agent, at which point agent server 125 may use transfer networks to continue the fund transfer electronically. Likewise, in another example, receiver 110 may come to a physical agent operated or associated location to receive a cash, check, money order, prepaid or stored value account, debit card, ATM card and/or credit card payment, which previously arrived at the location via electronic means. Cash payment systems are described in U.S. Pat. No. 6,994,251, issued May 22, 2003 and entitled "Cash Payment for Remote Transactions," the entire disclosure of which is hereby incorporated by reference for all purposes.

Figure 2:
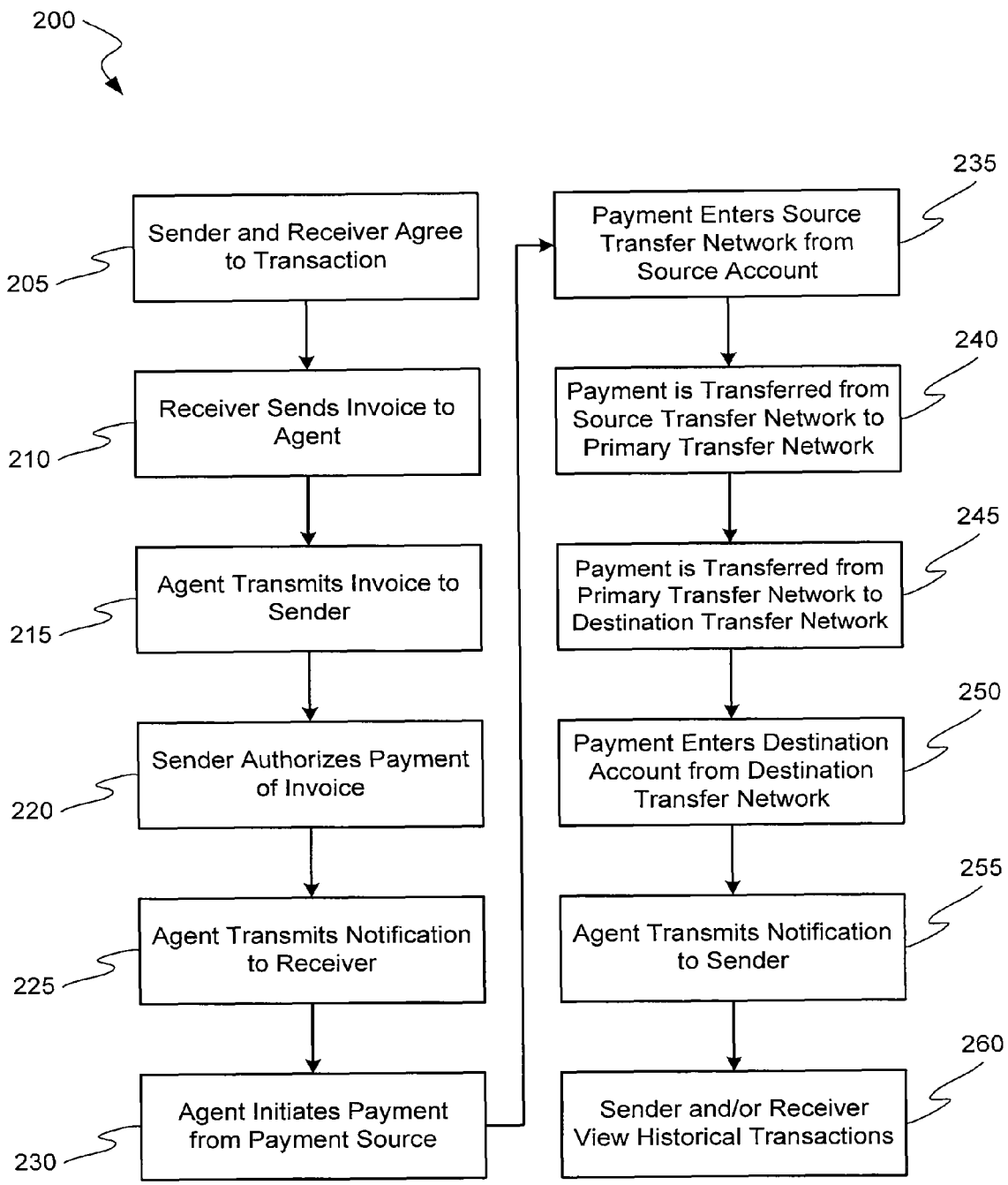
FIG. 2 is a block diagram of one method of the invention for making financial transfers between subscribers of a financial transfer service.

FIG. 2 shows one method 200 of the invention for making financial transfers between subscribers of a financial transfer service. At block 205, sender 105 and receiver 110 agree to a transaction, possibly with the assistance of agent server 125.

At block 210, receiver 110 sends an invoice or invoice information to agent server 125. At block 215, the agent server transmits the invoice to sender 105. At block 220, sender 105 may authorize payment of the invoice, possibly by sending payment information to agent server 125.

At block 225, agent server 125 may transmit notification of the payment authorization to receiver 110. Receiver 110 may use this notification as enough assurance to proceed with provision of the goods and/or services agreed to in the transaction.

At block 230, agent server 125 may initiate a fund transfer from the source account 150 specified by the sender in the payment information. At block 235, the funds may be transferred from source account 150 through source transfer network 165.

At block 240, the funds may be transferred from source transfer network 165 to primary transfer network 160. At block 245, the funds may be transferred from primary transfer network 160 to destination transfer network 190.

At block 250, the funds may enter destination account 140 from destination transfer network 190. At block 255, agent server 125 may transmit notification of the final receipt of funds to sender 105.

In some embodiments, agent server 125 may also transmit notification to receiver 1 10. In other embodiments, receiver 110 may receive an independent notification of receipt of funds directly from an institution associated with destination account 140.

At block 260, agent server 125 may transmit status and/or historical information regarding fund transfers to sender 105 and/or receiver 110. This may occur in either a "push" or "pull" fashion in interaction with either the sending subscriber interface and/or the receiving subscriber interface.

Figure 3:
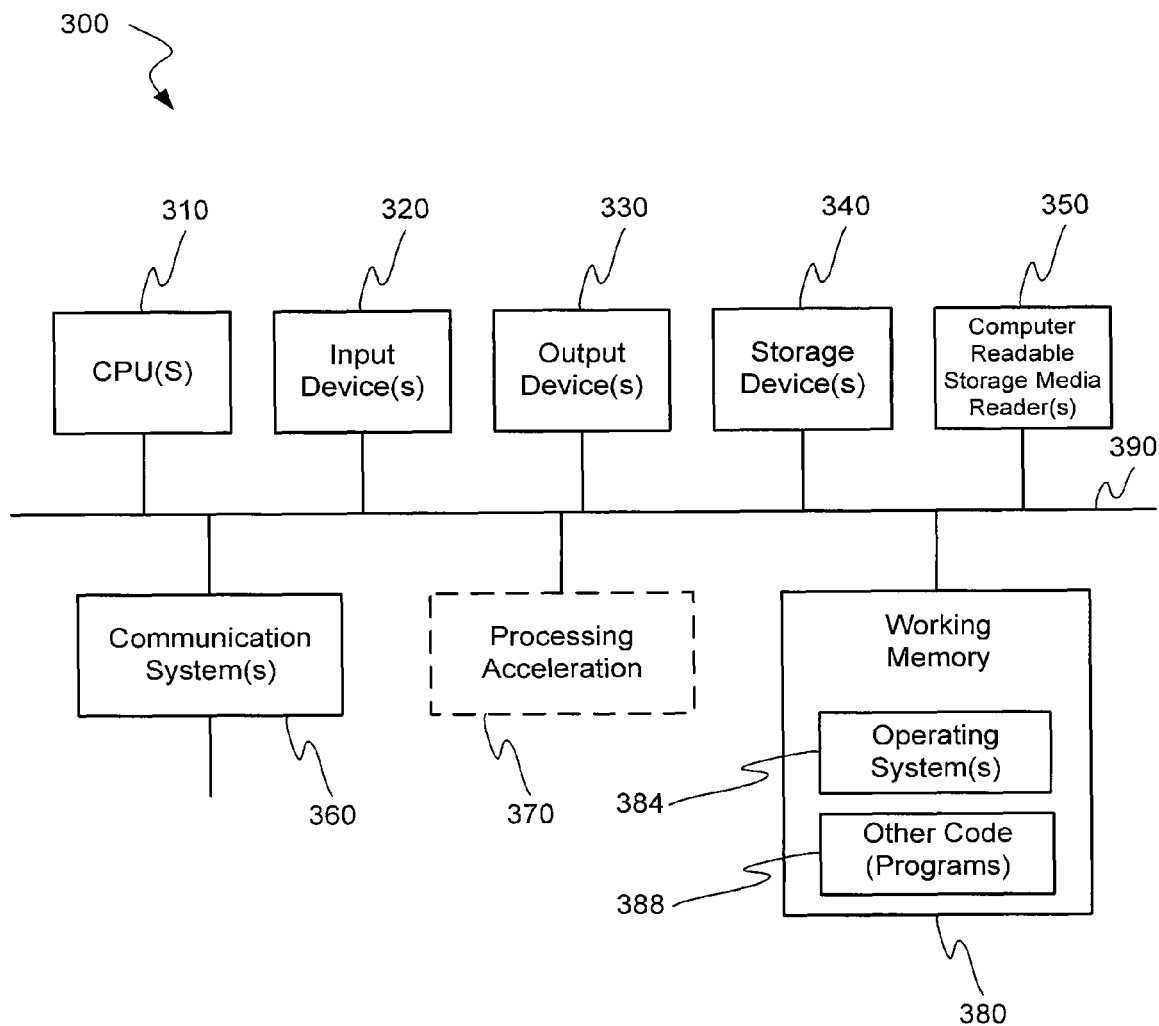
FIG. 3 is a block diagram of an exemplary computer system capable of being used in at least some portion of the apparatuses or systems of the present invention, or implementing at least some portion of the methods of the present invention.

FIG. 3 is a block diagram illustrating an exemplary computer system 500 in which embodiments of the present invention may be implemented. This example illustrates a computer system 300 such as may be used, in whole, in part, or with various modifications, to provide the functions of the sending subscriber interface, the receiving subscriber interface, the agent server 125, the source transfer network 165, the primary transfer network 160, the destination transfer network 190, the communication network 115, and/or other components of the invention such as those discussed above. For example, various functions of the agent server 125 may be controlled by the computer system 300, including, merely by way of example, transmitting interfaces to the sender 105 and/or receiver 110, accessing source and destination accounts 150, 140, reporting fund transfer status to the sender 105 and/or receiver 110, etc.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, the computer system 300 may also include a processing acceleration unit 370, which can include a digital signal processor, a special-purpose processor and/or the like.

The computer-readable storage media reader 350 can further be connected to a computer-readable storage medium, together (and, optionally, in combination with storage device (s) 340) comprehensively representing remote, local, fixed, and/or removable storage devices plus storage media for temporarily and/or more permanently containing computer-readable information. The communications system 360 may permit data to be exchanged with a network, system, computer and/or other component described above.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 300 may include code 388 for implementing any or all of the function of the various elements of the architecture as described herein. For example, software, stored on and/or executed by a computer system such as system 300, can provide the functions of the sending subscriber interface, the receiving subscriber interface, the agent server 125, the source transfer network 165, the primary transfer network 160, the destination transfer network 190, the communication network 115, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the disclosure.

What is claimed is:

1. A system for making financial transfers between subscribers of a financial transfer service, wherein the system comprises:
   a seller subscriber computer configured to accept a set of invoice information input by a seller, wherein the set of invoice information includes an identifier of a destination account, an amount of funds to be transferred, and a description of goods or services;
   a buyer subscriber computer configured to accept a set of payment information input by a buyer, wherein the set of payment information includes an identifier of a source account; and
   an agent server computer in communication with the buyer subscriber computer and the seller subscriber computer, wherein the agent server computer is configured to:
      receive the set of invoice information from the seller subscriber computer;
      create an invoice based at least in part on the set of invoice information, wherein the invoice includes:
         the identifier of the destination account; and
         the amount of funds to be transferred;
      transmit the invoice to the buyer subscriber computer;
      receive the set of payment information from the buyer subscriber computer as an authorization from the buyer to pay the invoice;
      establish an exchange conversion for the amount of funds; and
      cause the amount of funds according to the exchange conversion to be transferred from the source account on a source transfer network to the destination account on a destination transfer network via a primary transfer network.

2. The system for making financial transfers between subscribers of a financial transfer service of claim 1, wherein the seller subscriber computer and the buyer subscriber computer together consist of only a single interface.

3. The system for making financial transfers between subscribers of a financial transfer service of claim 1, wherein the agent server computer is in more direct communication with the primary transfer network than the source transfer network or the destination transfer network.

4. The system for making financial transfers between subscribers of a financial transfer service of claim 1, wherein the source account comprises a cash payment received by an agent or the buyer.

5. The system for making financial transfers between subscribers of a financial transfer service of claim 1, wherein the destination account comprise a cash payment made to the seller by an agent or the buyer.

6. The system for making financial transfers between subscribers of a financial transfer service of claim 1, wherein the seller subscriber computer being configured to accept the set of invoice information from the seller comprises the seller subscriber computer being configured to communicate over a communication network distinct from the source transfer network, the destination transfer network, and the primary transfer network.

7. The system for making financial transfers between subscribers of a financial transfer service of claim 1, wherein the seller subscriber computer is further configured to view a past set of invoice information and a set of information related to the past set of invoice information which comprises at least one financial detail related to the past set of invoice information.

8. The system for making financial transfers between subscribers of a financial transfer service of claim 1, wherein the amount of funds transferred from the source account on the source transfer network to the destination account on the destination transfer network is based at least in part on a fee rate determined by an agent and the buyer.

9. The system for making financial transfers between subscribers of a financial transfer service of claim 8, wherein the fee rate is further determined by a risk score of the buyer.

10. The system for making financial transfers between subscribers of a financial transfer service of claim 1, wherein the set of invoice information further includes a set of early payment incentive information, and wherein the set of payment information further includes a set of early payment incentive instructions.

11. A method for making financial transfers between subscribers of a financial transfer service, wherein the method comprises:
   receiving, at an agent server computer, a set of invoice information from a seller, wherein the set of invoice information includes an identifier of a destination account, an amount of funds to be transferred, and a description of goods or services;
   creating, at the agent server computer, an invoice based at least in part on the set of invoice information, wherein the invoice includes:
      the identifier of the destination account; and
      the amount of funds to be transferred;
   transmitting, at the agent server computer, the invoice to a buyer;
   receiving, at the agent server computer, a set of payment information from the buyer, wherein the set of payment information includes an identifier of a source account;
   establishing, at the agent server computer, an exchange conversion for the amount of funds; and
   transferring, at the agent server computer, the amount of funds according to the exchange conversion from the source account on a source transfer network to the destination account on a destination transfer network via a primary transfer network.

12. The method for making financial transfers between subscribers of a financial transfer service of claim 11, wherein the method further comprises storing a past set of invoice information and a set of information related to the past set of information which comprises at least one financial detail related to the past set of invoice information.

13. The method for making financial transfers between subscribers of a financial transfer service of claim 11, wherein the method further comprises determining a fee rate, and wherein the amount of funds is based at least in part on the fee rate.

14. The method for making financial transfers between subscribers of a financial transfer service of claim 13, wherein the fee rate is determined by a risk score of the seller.

15. The method for making financial transfers between subscribers of a financial transfer service of claim 11, wherein receiving the set of invoice information from the seller comprises receiving a set of early payment incentive information, and wherein receiving a set of payment information comprises receiving a set of early payment incentive instructions.

16. The method for making financial transfers between subscribers of a financial transfer service of claim 15, wherein the set of early payment incentive instructions comprises an instruction to satisfy an early payment incentive in the set of early payment incentive information if an amount saved by satisfying the early payment incentive is higher than a rate of return on an amount necessary to satisfy the early payment inventive.

17. The method for making financial transfers between subscribers of a financial transfer service of claim 11, wherein:
the invoice information further comprises a trigger condition, wherein the trigger condition comprises a requirement that a third party inform the agent server computer that a certain event has transpired; and
transmitting the invoice to the buyer occurs only after the trigger condition is satisfied.

18. The method for making financial transfers between subscribers of a financial transfer service of claim 11, wherein transferring the amount of funds comprises transmitting partial payments in proportion to stages related to provision of the goods or services.

19. The method for making financial transfers between subscribers of a financial transfer service of claim 11, wherein the method further comprises receiving, at the agent server:
early payment incentives from the seller; and
early payment incentive instructions from the buyer.

20. The method for making financial transfers between subscribers of a financial transfer service of claim 19, wherein the early payment incentive instruction from the buyer comprises instructions to make early payment according to terms of the early payment incentive if the early payment incentive provides a greater financial incentive than retaining funds for the invoice.

21. The method for making financial transfers between subscribers of a financial transfer service of claim 17, wherein the certain event comprises a selection from a group consisting of:
verification of availability of the goods or services;
packaging of the goods;
shipment of the goods; and
a certain progression of a shipment through a shipper's shipping system.

22. The method for making financial transfers between subscribers of a financial transfer service of claim 18, wherein the stages related to provision of the goods or services, and the partial payments in proportion to the stages are as follows:
25% partial payment for down payment;
50% partial payment on delivery or performance of the goods or services; and
25% partial payment upon certification of the goods or services.

23. A method for making financial transfers between subscribers of a financial transfer service, wherein the method comprises:
receiving, at an agent server computer, a set of invoice information from a seller, wherein the set of invoice information includes an identifier of a destination account, an amount of funds to be transferred, and a description of goods or services;
creating, at the agent server computer, an invoice based at least in part on the set of invoice information;
determining, with the agent server computer, if a computer interface of the buyer is active, and:
if the computer interface of the buyer is active, transmitting, from the agent server computer, the invoice to the computer interface of the buyer; and
if the computer interface of the buyer is not active, storing the invoice for later transmission at the request of the computer interface of the buyer once active;
receiving, at the agent server computer, a set of payment information from the buyer, wherein the set of payment information includes an identifier of a source account;
establishing, at the agent server computer, an exchange conversion for the amount of funds; and
transferring, at the agent server computer, the amount of funds according to the exchange conversion from the source account on a source transfer network to the destination account on a destination transfer network via a primary transfer network.

* * * * *

UNITED STATES PATENT AND TRADEMARK OFFICE
CERTIFICATE OF CORRECTION

| | | |
|---|---|---|
| PATENT NO. | : 8,521,648 B2 | Page 1 of 1 |
| APPLICATION NO. | : 12/134066 | |
| DATED | : August 27, 2013 | |
| INVENTOR(S) | : Bixler et al. | |

It is certified that error appears in the above-identified patent and that said Letters Patent is hereby corrected as shown below:

On the Title Page:

Item [73], please delete "The Western University Company" and insert -- The Western Union Company --.

Signed and Sealed this
Twenty-ninth Day of April, 2014

Michelle K. Lee
*Deputy Director of the United States Patent and Trademark Office*